Patented June 12, 1945

2,378,198

UNITED STATES PATENT OFFICE 2,378,198

REACTION PRODUCTS OF ALDEHYDES AND TRIAZINE DERIVATIVES

Gaetano F. D'Alelio, Pittsfield, Mass., assignor to General Electric Company, a corporation of New York No Drawing. Application July 21, 1942, Serial No. 451,759

14 Claims. (Cl. 260—72)

This invention relates to the production of new synthetic materials and more particularly to new reaction products of particular utility in the plastics and coating arts. Specifically, the invention is concerned with compositions of matter comprising the reaction product of (1) a chlorinated acetamide with (2) the product of partial reaction of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a triazine derivative corresponding to the following general formula:

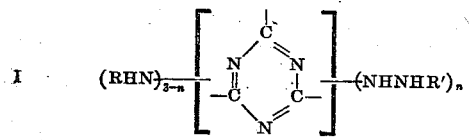

where $n$ represents an integer and is at least 1 and not more than 3, R' represents a member of the class consisting of monovalent hydrocarbon radicals and substituted hydrocarbon radicals, more particularly halo-hydrocarbon radicals, and R represents a member of the class which is the same as R' and, in addition, hydrogen. It will be noted that when $n$ is 3 there will be no —NHR groups attached to the triazine nucleus.

Illustrative examples of radicals that R and R' in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R and R' in the above formula may represent are: chloromethyl, chloroethyl, chlorophenyl, dichlorophenyl, ethyl chlorophenyl, phenyl chloroethyl, chlorocyclohexyl, phenyl bromoethyl, bromoethyl, bromopropyl, fluorophenyl, iodophenyl, bromotolyl, etc.

Preferably R in Formula I is hydrogen and R' is an unsubstituted monovalent hydrocarbon radical, for instance a monovalent aliphatic (e. g., alkyl, alkenyl) hydrocarbon radical or a monovalent aromatic hydrocarbon radical such, for example, as a phenyl or a tolyl radical. Instead of the symmetrical triazines (s-triazines) represented by the above formula, corresponding derivatives of the asymmetrical triazines or of the vicinal triazines may be used.

The hydrocarbon-substituted and halo-hydrocarbon-substituted hydrazino triazines used in practicing the present invention conveniently are prepared by effecting reaction between a triamino triazine containing at least one unsubstituted amino group and a hydrocarbon-substituted or a halo-hydrocarbon-substituted hydrazine. This reaction may be represented by the following general equation, where $n$, R and R' have the same meanings as given above with reference to Formula I:

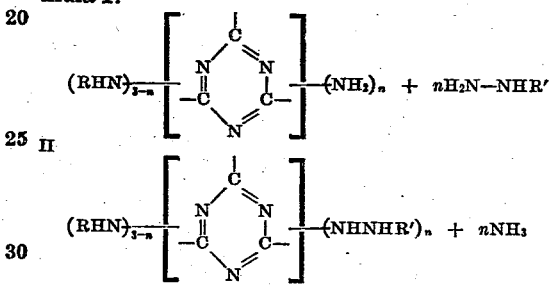

This reaction may be effected in the presence or absence of a suitable solvent, but preferably is carried out in the absence of a solvent. In some cases it is desirable to effect the reaction in the presence of a small amount of a mineral acid, which reacts with the liberated ammonia and increases the speed of the reaction in the desired direction. The reaction usually is carried out at elevated temperatures and at atmospheric pressure, although sub-atmospheric or super-atmospheric pressure may be used if desired.

As a more specific example of the preparation of the hydrocarbon-substituted hydrazino triazines used in carrying the present invention into effect, the following more detailed description is given relative to the preparation of 2-phenylhydrazino 4,6-diamino s-triazine. All parts are by weight.

Melamine (126 parts) and phenylhydrazine (108 parts) were mixed in a flask equipped with a reflux condenser, the flask being immersed in a heating bath. The bath temperature was maintained at 140–150° C. for 6½ hours and then was raised to 160° C. for 15¾ hours. A final heating at 170° C. for 14 hours completed the reaction. Evolution of ammonia was evident during the entire reaction period. The reaction product comprising impure 2-phenylhydrazino 4,6-diamino s-triazine was washed with cold water. The washed product was dissolved in 2,000 parts water, after which the solution was decolorized by contacting it with a decolorizing carbon. The decolorized solution was concentrated to one-half its original volume and chilled. A yield of 85 parts of purified 2-phenylhydrazino 4,6-diamino s-triazine was obtained from the chilled solution. The purified material was in the form of white, flaky crystals. The crystalline product sublimed when heated above 290° C. This compound also may be named 4-phenylhydrazino 2,6-diamino s-triazine, 6-phenylhydrazino 2,4-diamino s-triazine or merely as phenylhydrazino diamino s-triazine.

Specific examples of triazine derivatives embraced by Formula I that may be used in producing my new compositions are listed below:

2-methylhydrazino 4,6-diamino s-triazine (4-methylhydrazino 2,6-diamino s-triazine; 6-methylhydrazino 2,4-diamino s-triazine)
2,4-di-(methylhydrazino) 6-amino s-triazine
2,4,6-tri-(methylhydrazino) s-triazine
2-ethylhydrazino 4,6-diamino s-triazine
2-isobutylhydrazino 4,6-diamino s-triazine
2-allylhydrazino 4,6-diamino s-triazine
2-propenylhydrazino 4,6-diamino s-triazine
2-cyclopentylhydrazino 4,6-diamino s-triazine
2-phenylhydrazino 4,6-di-(methylamino) s-triazine
2-tolylhydrazino 4,6-diamino s-triazine
2-naphthylhydrazino 4,6-diamino s-triazine
2-benzylhydrazino 4,6-diamino s-triazine
2-methylhydrazino 4,6-di-(methylamino) s-triazine
2,4-di-(phenylhydrazino) 6-amino s-triazine
2,4,6-tri-(phenylhydrazino) s-triazine
2-propylhydrazino 4,6-di-(isobutylamino) s-triazine
2-pentylhydrazino 4,6-di-(propenylamino) s-triazine
2-xylylhydrazino 4,6-di-(cyclopentylamino) s-triazine
2-phenethylhydrazino 4,6-dianilino s-triazine
2-ethylphenylhydrazino 4,6-di-(fluorotoluido) s-triazine
2-phenylhydrazino 4,6-di-(methylamino) s-triazine
2-methylhydrazino 4-methylamino 6-amino s-triazine
2-chlorophenylhydrazino 4,6-diamino s-triazine
2-chloroethylhydrazino 4-anilino 6-amino s-triazine
2-phenylhydrazino 4-iodoanilino 6-ethylamino s-triazine
2-naphthylhydrazino 4,6-di-(bromotoluido) s-triazine
2,4-di-(phenylhydrazino) 6-methylamino s-triazine
2,4,6-tri-(tolylhydrazino) s-triazine
2,4,6-tri-(hexylhydrazino) s-triazine
2,4-di-(allylhydrazino) 6-amino s-triazine
2,4-di-(cyclohexylhydrazino) 6-chloroanilino s-triazine
2,4-di-(bromoxenylhydrazino) 6-amino s-triazine
2-fluorophenylhydrazino 4,6-diamino s-triazine
2,4-di-(butylhydrazino) 6-butylamino s-triazine
2-(tetradecylhydrazino) 4,6-diamino s-triazine
2,4-di-(xylylhydrazino) 6-amino s-triazine The present invention is based on my discovery that new and valuable materials of particular utility in the plastics and coating arts can be produced by effecting partial reaction between ingredients comprising essentially an aldehyde, including polymeric aldehydes, hydroxyaldehydes, and aldehyde-addition products, and triazine derivatives of the kind embraced by Formula I, numerous examples of which have been given above. Thereafter a curing reactant, specifically a chlorinated acetamide, is caused to react with this partial reaction product.

In the production of molded articles from molding compositions comprising a filled or unfilled thermosetting resin, it is highly desirable that the molding compound have a high plastic flow during molding combined with a rapid cure to an insoluble, infusible state. Surprisingly it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. Their water resistance also is materially better than that of resins made by reaction of an aldehyde with similar triazine derivatives wherein the hydrazino radical is unsubstituted. This was quite surprising and unexpected and in no way could have been predicted. The cured resins of the present invention also have a high resistance to heat and abrasion and, therefore, are especially suitable for use where optimum heat- and abrasion-resistance are properties of primary importance.

Resins heretofore have been made by condensing an aldehyde with an aminotriazine, e. g., melamine. The suggestion also has been made that resinous materials be prepared by condensing an aliphatic aldehyde containing at the most six carbon atoms, specifically formaldehyde, with cyanurtrihydrazide, III 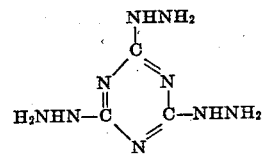

Although such resins have valuable properties and are suitable for many applications, the high basicity of such triazine derivatives imparts to resins prepared therefrom a poorer resistance to aqueous solvents than many applications require. These and other disadvantages in the materials of this class heretofore known in the resin art are avoided by using as a starting reactant a triazine derivative wherein at least one of the substituent groupings attached to the triazine nucleus is a hydrocarbon-substituted or a halohydrocarbon-substituted hydrazino radical.

In practicing my invention the initial condensation reaction may be carried out at normal or at elevated temperatures, at atmospheric, subatmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., urea ($NH_2CONH_2$), thiourea, selenourea and iminourea (guanidine), substituted ureas, thioureas, selenoureas and iminoureas, more particularly urea derivatives such as mentioned, for example, in my Patent No. 2,285,418, page 1, column 1, lines 41–49; monoamides of monocarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of mine, for instance in my copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in my Patent No. 2,239,441; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative and the aldehyde to form an intercondensation product by mixing all the reactants and effecting condensation therebetween or by various permutations of reactants as described, for example, in my Patent No. 2,285,418 with particular reference to reactions involving a urea, an aliphatic aldehyde and a chlorinated acetamide. For example, I may form a partial condensation product of ingredients comprising (1) urea or melamine or urea and melamine, (2) a triazine derivative of the kind embraced by Formula I, e. g., an arylhydrazino diamino s-triazine (e. g., phenylhydrazino diamino s-triazine, tolylhydrazino diamino s-triazine), an alkylhydrazino diamino s-triazine (e. g., ethylhydrazino diamino s-triazine) etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may also be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| 2-phenylhydrazino 4,6-diamino s-triazine | 65.2 |
| Aqueous formaldehyde (approx. 37.1% HCHO) | 73.0 |
| Aqueous ammonia (approx. 28% $NH_3$) | 6.0 |
| Sodium hydroxide in 5 parts water | 0.1 | were heated together under reflux at the boiling temperature of the mass for 15 minutes, yielding a clear, colorless, resinous syrup. To 111.5 parts of this syrup was added 0.5 part chloroacetamide (monochloroacetamide) and heating under reflux was continued for an additional 10 minutes. A molding (moldable) compound was prepared from the resulting intercondensation product by mixing therewith 35 parts alpha cellulose in flock form and 0.2 part of a mold lubricant, specifically zinc stearate. The wet molding compound was dried for 1½ hours at 64° C. A sample of the dried and ground molding compound was molded for 4 minutes at 130° C. under a pressure of 2,000 pounds per square inch. The molded piece was well cured throughout, had a good surface finish and excellent resistance to water. When the molded article was tested for its water resistance by immersing in boiling water for 15 minutes followed by immersion in cold water for 5 minutes, it absorbed only 0.29% by weight of water. (The ordinary urea-formaldehyde molding compositions yield molded articles that, when similarly tested for water resistance, absorb about 5–7% by weight of water.) The molding compound showed very good flow characteristics during molding as evidenced by the amount of flash on the molded piece.

Instead of using chloroacetamide (monochloroacetamide) in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.).

Example 2

| | Parts |
|---|---|
| 2-phenylhydrazino 4,6-diamino s-triazine | 21.7 |
| Urea | 24.0 |
| Aqueous formaldehyde (approx. 37.1% HCHO) | 81.0 |
| Aqueous ammonia (approx. 28% NH₃) | 4.5 |
| Sodium hydroxide in 5 parts water | 0.1 |
| Chloroacetamide | 0.5 |

All of the above ingredients with the exception of the chloroacetamide were heated together under reflux at the boiling temperature of the mass for 30 minutes, yielding a water-white, resinous syrup. This syrup bodied to a thermoplastic resin when a sample of it was heated on a 140° C. hot plate. The chloroacetamide was added to the main portion of the syrup and heating under reflux was continued for an additional 10 minutes. The resulting syrupy condensation product was mixed with 35 parts alpha cellulose and 0.2 part zinc stearate to form a molding compound. The wet molding composition was dried for 3 hours at 60° C. A well-cured molded piece having a glossy surface finish was produced by molding a sample of the dried and ground molding compound for several minutes at 130° C. under a pressure of 2,000 pounds per square inch. The molding compound showed very good plastic flow during molding.

Example 3

| | Parts |
|---|---|
| 2-phenylhydrazino 4,6-diamino s-triazine | 4.5 |
| Phenyl (synthetic) | 45.0 |
| Aqueous formaldehyde (approx. 37.1% HCHO) | 97.5 |
| Potassium carbonate in a small amount of water | 1.43 |

A phenol-formaldehyde liquid partial condensation product was prepared by heating together the above-stated amounts of phenol, formaldehyde and potassium carbonate for 4 hours at 50–60° C. The triazine derivative was now added and the mixture was heated under reflux at boiling temperature for 1 hour, thereby causing the triazine derivative to intercondense with the phenol-formaldehyde liquid partial condensation product. The syrupy condensation product obtained in this manner was acidified with 2.5 parts oxalic acid dissolved in 50 parts water. The acidified syrup was mixed with 57 parts alpha cellulose and 0.6 part zinc stearate to form a molding compound. The wet molding composition was dried for 2½ hours at 64° C. A well-cured molded piece that was exceptionally light in color was obtained by molding a sample of the dried and ground molding compound for 5 minutes at 130° C. under a pressure of 2,000 pounds per square inch. The molding compound showed good plastic flow during molding.

Example 4

| | Parts |
|---|---|
| 2-phenylhydrazino 4,6-diamino s-triazine | 21.7 |
| Furfural | 28.8 |
| Sodium hydroxide in 5 parts water | 0.1 | were heated together under reflux at the boiling temperature of the mass for 30 minutes, yielding a viscous, brownish resin. This viscous resin cured slowly to an infusible state in the absence of a curing agent when a sample of it was heated on a 140° C. hot plate. The addition of sulfamic acid, chloroacetamide or other curing agent such as mentioned under Example 1 to the resinous syrup yielded a material that cured more rapidly to an insoluble and infusible state when a sample was heated on a 140° C. hot plate. The resinous material of this example is suitable for use in the production of molding compounds.

Example 5

| | Parts |
|---|---|
| 2-phenylhydrazino 4,6-diamino s-triazine | 21.7 |
| Acrolein | 16.8 |
| Sodium hydroxide in 5 parts water | 0.1 | were heated together under reflux at the boiling temperature of the mass for 15 minutes. At the end of this period of time a yellow resin had precipitated. When a sample of this resin was heated on a 140° C. hot plate it melted and then cured to an insoluble and infusible state in the absence of any added curing agent.

Example 6

| | Parts |
|---|---|
| 2-phenylhydrazino 4,6-diamino s-triazine | 21.7 |
| Butyl alcohol | 74.0 |
| Aqueous formaldehyde (approx. 37.1% HCHO) | 48.6 |
| Sodium hydroxide in 5 parts water | 0.1 | were heated together under reflux at boiling temperature for 30 minutes, yielding a clear, water-white syrup. When a sample of the syrupy condensation product was heated on a 140° C. hot plate it cured slowly to an infusible state without any added curing agent. A more rapidly curing composition was produced by incorporating into the syrupy condensation product or into the dehydrated resin various curing agents such as mentioned under Example 1, for instance citric acid, sulfamic acid, chloroacetamide, etc. Glass plates were coated with samples of the syrupy material containing a curing agent and the coated plates then were baked for several hours at an elevated temperature. The baked coatings were hard, transparent and water-resistant. The solubility and film-forming characteristics of the resinous composition of this example make it especially suitable for use in the preparation of coating and impregnating compositions. For example, it may be used in the production of spirit and baking varnishes. It may be employed as a modifier of varnishes of the aminoplast and alkyd-resin types.

Example 7

| | Parts |
|---|---|
| 2-phenylhydrazino 4,6-diamino s-triazine | 21.7 |
| Acetamide | 5.9 |
| Aqueous formaldehyde (approx. 37.1% HCHO) | 32.4 |
| Sodium hydroxide in 5 parts water | 0.1 | were heated together under reflux at boiling temperature for 30 minutes, yielding a viscous, water-white syrup. The syrupy material was potentially heat-curable as shown by the fact that when nitrourea, sulfamic acid or other curing agent such as mentioned under Example 1 was added to the syrup, followed by heating on a 140° C. hot plate, the syrupy resin cured slowly to an insoluble and infusible state. The properties of the resinous material of this example make it particularly suitable for use as a modifier of less plastic aminoplasts and other resinous materials of unsatisfactory flow characteristics to improve their plasticity.

Example 8

| | Parts |
|---|---|
| 2-phenylhydrazino 4,6-diamino s-triazine | 21.7 |
| Diethyl malonate | 16.0 |
| Aqueous formaldehyde (approx. 37.1% HCHO) | 48.6 |
| Sodium hydroxide in 5 parts water | 0.1 | were heated together under reflux at the boiling temperature of the mass for 15 minutes. The resulting syrupy condensation product cured slowly to an insoluble and infusible state when a sample of it was heated on a 140° C. hot plate. The addition of a curing agent such as mentioned under Example 1 accelerated the conversion of the resin to a cured state. The cured resin showed excellent resistance to water, alcohol and other organic solvents.

Example 9

| | Parts |
|---|---|
| 2-phenylhydrazino 4,6-diamino s-triazine | 21.7 |
| Glycerine | 9.2 |
| Aqueous formaldehyde (approx. 37.1% HCHO) | 32.4 |
| Sodium hydroxide in 5 parts water | 0.1 | were heated together under reflux at boiling temperature for 30 minutes, yielding a water-white, syrupy condensation product. This syrup bodied to a thermoplastic resin when a sample of it was heated on a 140° C. hot plate. The addition of chloroacetamide or other curing agent such as mentioned under Example 1 to the resinous syrup, followed by heating on a 140° C. hot plate, caused the syrup to cure to an infusible, hard resin. The plastic flow of the resin during curing indicated that the product of this example would be particularly suitable for use as a modifier of less plastic aminoplasts to improve their flow characteristics.

Example 10

| | Parts |
|---|---|
| 2-phenylhydrazino 4,6-diamino s-triazine | 21.7 |
| Polyvinyl alcohol | 26.4 |
| Aqueous formaldehyde (approx. 37.1% HCHO) | 64.8 |
| Sodium hydroxide in 5 parts water | 0.1 | were heated together under reflux at boiling temperature for 30 minutes. The viscous syrup thereby obtained bodied to a thermoelastic resin when a sample of it was heated at 140–150° C. A thermosetting resin was produced by incorporating into the viscous syrup a small amount of an acid, specifically hydrochloric acid. Articles were coated with the syrupy material containing a small amount of hydrochloric acid and the coated articles were baked at temperatures of the order of 125–150° C. The baked coatings were tough, transparent and highly resistant to attack by water. Instead of hydrochloric acid, phthalic acid or other curing agent such as mentioned under Example 1 may be used to improve the curing characteristics of the initial condensation product. The resinous composition of this example may be used in the production of molding compounds and in the preparation of coating and impregnating compositions.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10 inclusive at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific hydrocarbon-substituted hydrazino s-triazine named in the above illustrative examples. Thus, instead of 2-phenylhydrazino 4,6-diamino s-triazine I may use, for example 2-methylhydrazino 4,6-diamino s-triazine, 2-phenylhydrazino 4,6-di-(methylamino) s-triazine, 2-tolylhydrazino 4,6-diamino s-triazine, 2,4-di-(phenylhydrazino) 6-amino s-triazine, 2,4,6-tri-(phenylhydrazino) s-triazine, 2,4-di-(methylhydrazino) 6-amino s-triazine, 2,4,6-tri-(methylhydrazino) s-triazine, or any other compound of the kind embraced by Formula I, numerous examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular properties desired in the finished product. Ordinarily these reactants are employed in an amount corresponding to at least one mol of the aldehyde, specifically formaldehyde, for each mol of the triazine derivative. Thus, I may use, for example, from 1 to 8 or 9 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio Patent No. 2,281,559; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc.; polyvinyl ethers, including polyvinyl acetals, specifically polyvinyl formal, etc.

Instead of effecting reaction between a triazine derivative of the kind embraced by Formula I and an aldehyde, specifically formaldehyde, I may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of (1) a chlorinated acetamide with (2) the product of partial reaction of ingredients comprising an aldehyde and a compound corresponding to the general formula

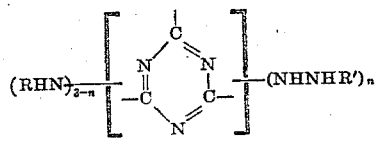

where $n$ represents an integer and is at least 1 and not more than 3, R' represents a member of the class consisting of monovalent hydrocarbon radicals and halo-hydrocarbon radicals, and R represents a member of the class which is the same as R' and, in addition, hydrogen.

2. A composition as in claim 1 wherein R represents hydrogen.

3. A composition as in claim 1 wherein the aldehyde is formaldehyde.

4. A resinous composition comprising the reaction product of (1) a chlorinated acetamide with (2) a partial reaction product of ingredients comprising formaldehyde and phenylhydrazino diamino s-triazine.

5. A resinous composition comprising the reaction product of (1) a chlorinated acetamide with (2) a partial reaction product of ingredients comprising formaldehyde and tolylhydrazino diamino s-triazine.

6. A resinous composition comprising the reaction product of (1) a chlorinated acetamide with (2) a partial reaction product of ingredients comprising formaldehyde and ethylhydrazino diamino s-triazine.

7. A composition comprising the reaction product of (1) a chlorinated acetamide with (2) the product of partial reaction of ingredients comprising a urea, an aldehyde and a compound corresponding to the general formula

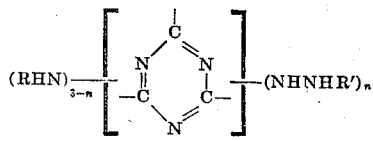

where $n$ represents an integer and is at least 1 and not more than 3, R' represents a member of the class consisting of monovalent hydrocarbon radicals and halo-hydrocarbon radicals, and R represents a member of the class which is the same as R' and, in addition, hydrogen.

8. A composition as in claim 7 wherein R represents hydrogen, the aldehyde is formaldehyde and the urea component is the compound corresponding to the formula $NH_2CONH_2$.

9. A resinous composition comprising the reaction product of (1) a chlorinated acetamide with (2) the product of partial reaction, under alkaline conditions, of ingredients comprising urea, formaldehyde and phenylhydrazino diamino s-triazine.

10. A composition comprising the reaction product of (1) a chlorinated acetamide with (2) the product of partial reaction of ingredients comprising melamine, an aldehyde and a compound corresponding to the general formula

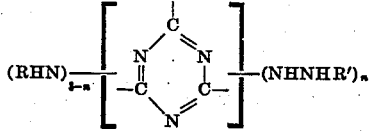

where $n$ represents an integer and is at least 1 and not more than 3, R' represents a member of the class consisting of monovalent hydrocarbon radicals and halo-hydrocarbon radicals, and R represents a member of the class which is the same as R' and, in addition, hydrogen.

11. A resinous composition comprising the reaction product of (1) a chlorinated acetamide with (2) the product of partial reaction, under alkaline conditions, of ingredients comprising melamine, formaldehyde and phenylhydrazino diamino s-triazine.

12. A heat-curable composition comprising the heat-convertible resinous reaction product of (1) a partial condensation product of ingredients comprising formaldehyde and a compound corresponding to the general formula

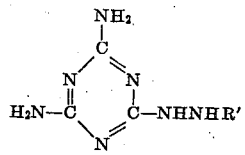

where R' represents a monovalent hydrocarbon radical, and (2) a chlorinated acetamide.

13. A composition as in claim 12 wherein the chlorinated acetamide is monochloroacetamide.

14. The method of preparing new synthetic compositions which comprises effecting partial reaction between ingredients comprising an aldehyde and a compound corresponding to the general formula

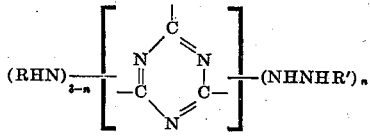

where $n$ represents an integer and is at least 1 and not more than 3, R' represents a member of the class consisting of monovalent hydrocarbon radicals and halo-hydrocarbon radicals, and R represents a member of the class which is the same as R' and, in addition, hydrogen, adding a chlorinated acetamide to the resulting partial reaction product, and causing the said chlorinated acetamide to react with the said partial reaction product.

GAETANO F. D'ALELIO.